US 8,391,214 B2
Mar. 5, 2013

(12) United States Patent
Carpelan

(10) Patent No.: US 8,391,214 B2
(45) Date of Patent: *Mar. 5, 2013

(54) ASSIGNING RADIO CHANNELS IN A WIRELESS NETWORK

(75) Inventor: Paulus Carpelan, Helsinki (FI)

(73) Assignee: Wi-LAN, Inc., Ottawa, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/311,202

(22) Filed: Dec. 5, 2011

(65) Prior Publication Data

US 2012/0077535 A1  Mar. 29, 2012

Related U.S. Application Data

(63) Continuation of application No. 11/948,311, filed on Nov. 30, 2007, now Pat. No. 8,072,924, which is a continuation of application No. 09/851,436, filed on May 9, 2001, now Pat. No. 7,317,704.

(30) Foreign Application Priority Data

May 12, 2000 (FI) .................................. 20001138

(51) Int. Cl.
H04W 4/00 (2009.01)

(52) U.S. Cl. ........................................................ 370/328

(58) Field of Classification Search ................... None
See application file for complete search history.

(56) References Cited

U.S. PATENT DOCUMENTS

| 5,918,181 | A | 6/1999 | Foster et al. | |
|---|---|---|---|---|
| 6,070,077 | A * | 5/2000 | Kim et al. | 455/452.2 |
| 6,131,038 | A | 10/2000 | Sekine | |
| 6,167,446 | A | 12/2000 | Lister et al. | |
| 6,175,739 | B1 * | 1/2001 | Ishii et al. | 455/452.1 |
| 6,286,044 | B1 | 9/2001 | Aoyama | |
| 6,442,256 | B1 | 8/2002 | Garland et al. | |
| 6,459,687 | B1 | 10/2002 | Bourlas | |
| 6,549,759 | B2 | 4/2003 | Arviv | |
| 6,577,863 | B2 | 6/2003 | Bourlas | |
| 6,683,866 | B1 | 1/2004 | Stanwood | |
| 6,693,887 | B2 | 2/2004 | Stanwood | |
| 6,694,141 | B1 | 2/2004 | Pulkkinen et al. | |
| 6,728,514 | B2 | 4/2004 | Bandeira | |
| 6,804,211 | B1 | 10/2004 | Klein | |

(Continued)

FOREIGN PATENT DOCUMENTS

| EP | 1 098 489 | 6/2006 |
|---|---|---|
| JP | 2000-092127 | 3/2000 |

(Continued)

OTHER PUBLICATIONS

"Comparison of Various WLAN Base Stations," http://web.archive.org/web/*/http://employees.org/~raj/wireless.html (Apr. 15, 2003).

(Continued)

Primary Examiner — Anh-Vu Ly
(74) Attorney, Agent, or Firm — Volpe and Koenig, P.C.

(57) ABSTRACT

A method and apparatus are provided for assigning radio channels to a set of base stations in a wireless network, including determining a plurality of available radio channels that the set of base stations have at their disposal for communications, selecting at least one of the plurality of available radio channels for a first plurality of the base stations, selecting at least another one of the plurality of available radio channels for at least a second plurality of the base stations, and assigning the selected radio channels to the corresponding pluralities of base stations.

8 Claims, 2 Drawing Sheets

U.S. PATENT DOCUMENTS

| | | | |
|---|---|---|---|
| 6,925,068 | B1 | 8/2005 | Stanwood |
| 6,944,188 | B2 | 9/2005 | Sinha |
| 6,956,834 | B2 | 10/2005 | Stanwood |
| 6,963,617 | B1 | 11/2005 | Armour |
| 7,006,530 | B2 | 2/2006 | Spinar |
| 7,023,798 | B2 | 4/2006 | Bourlas |
| 7,177,598 | B2 | 2/2007 | Klein |
| 7,197,022 | B2 | 3/2007 | Stanwood |
| 7,289,467 | B2 | 10/2007 | Bourlas |
| 7,317,704 | B2 * | 1/2008 | Carpelan .............. 370/329 |
| 7,379,441 | B2 | 5/2008 | Stanwood |
| 8,072,924 | B2 * | 12/2011 | Carpelan .............. 370/328 |
| 2008/0089284 | A1 | 4/2008 | Carpelan |

FOREIGN PATENT DOCUMENTS

| | | |
|---|---|---|
| JP | 2000-268016 | 9/2000 |

OTHER PUBLICATIONS

"Digilink 60 Professional Data Communications Point to Point in 60 GHz Band," Microwave Modules (UK) Ltd., (Apr. 1995).

"Transmission and Multiplexing™ ; Parameters for Radio-Relay Systems for the Transmission of Digital Signals and Analogue Video Signals Operating at Around 58 GHz, which do not require co-ordinated frequency planning," European Telecommunication Standard, 300 408 (Mar. 1996).

http://www.wi-fi.com.au/download/avaya/GSG_RF.pdf, Avaya, Residential Gateway I, Getting Started Guide (2001).

Miceli, Andrew, "Mobile Communications Seriers," Wireless Technician's Handbook, vol. 1999, pp. 60-62, part 3.5.

* cited by examiner

ASSIGNING RADIO CHANNELS IN A WIRELESS NETWORK

CROSS REFERENCE TO RELATED APPLICATIONS

This application is a continuation of U.S. application Ser. No. 11/948,311, filed Nov. 30, 2007 and entitled "ASSIGNING RADIO CHANNELS IN A WIRELESS NETWORK", which is a continuation of U.S. application Ser. No. 09/851,436, filed May 9, 2001, and entitled "ASSIGNING RADIO CHANNELS IN A WIRELESS NETWORK", which issued as U.S. Pat. No. 7,317,704 on Jan. 8, 2008, and which is incorporated by reference in its entirety, and which claims foreign priority under 35 U.S.C. §119 to Finland Application No. 20001138, filed May 12, 2000. The above-referenced applications are hereby incorporated by reference as if fully set forth herein.

BACKGROUND

The present disclosure relates to wireless networks, and more particularly relates to assigning radio channels in a wireless network.

For example, wireless local area networks comprise terminals, such as portable computers provided with wireless network cards and communicating on a radio wave via a base station. A base station creates a wireless local area network around itself whose coverage is about 20 to 50 m. In Europe, wireless local area networks have 13 radio channels at their disposal, one of which the base station determines to be used for local area network communication. Each wireless local area network also has to have a special network name, which is a common identifier of the base station and the terminals coupled to the network.

A solution is previously known wherein base stations of wireless local area networks are provided with certain default settings at the manufacturing stage, whereby for example the same radio channel is selected as the default value for all base stations. A problem in the above solution is interference between adjacent wireless local area networks. For example, in an apartment house environment, several separate wireless local area networks may be located at short distances from each other. If in this case the same radio channel is set to be used by the base stations, a situation arises wherein interference impairs the performance of the networks. In this case, the default channel is overloaded and the other channels are not used. End users are not always capable of changing channel settings and are not aware of the settings of surrounding interfering networks. This problem exists particularly in a home and small office environment. In larger companies, the situation is better since networks and channel assignment are generally carefully planned. Furthermore, an expert IT organization often maintains the networks, whereby no problems arise in reassignment of channels.

SUMMARY

The present disclosure provides a user-friendly solution enabling efficient utilization of different radio channels without requiring manual reassignment of radio channels that would require special skills and/or knowledge. This is achieved by a method of assigning radio channels to a set of base stations in a wireless network, in which method one radio channel out of a determined set of radio channels is assigned to each base station.

In an exemplary embodiment, a method is characterized by assigning available radio channels to the set of base stations during manufacture of the base stations in such a way that each radio channel occurs substantially an equal number of times.

Another exemplary embodiment is based on a method of assigning radio channels to base stations before they are taken into use such that all available radio channels are used equally. This minimizes interference between adjacent wireless networks, because in practice, base stations are likely to be distributed such that adjacent base stations do not use the same radio channel. This ensures network performance for a large number of terminals.

Yet another exemplary embodiment includes a method that first determines a given order for the radio channels. A first base station is then selected and one available radio channel is assigned thereto. Next, a second base station is selected, and the radio channel having the next order number is assigned thereto or, if the radio channel assigned to the first base station has the largest order number in the determined set of radio channels, then the radio channel having the smallest order number is assigned. Radio channels are assigned in this way according to order numbers in an ascending or descending order until radio channels are assigned to the entire set of base stations. This assignment of radio channels can be implemented with a simple counter for example such that a radio channel is selected for a first device in a production lot, and channels are then counted forward for each device manufactured. When the order number of a channel reaches a highest allowed order number, the next device is assigned the channel having the lowest allowed order number.

In another exemplary embodiment, a radio channel selected randomly out of a determined set of radio channels is assigned to a first base station. In this case, the starting order number is not always one, for example, which would lead to a situation wherein radio channels having the number one would be in use the most, but radio channels are distributed as evenly as possible to the entire available channel domain.

In another exemplary embodiment, a radio channel derived out of a determined set of radio channels based on an individual serial number is assigned to each base station. This allows for example the use of the last two numbers of the serial number of the base station for indicating the order number of the radio channel to be assigned.

In yet another exemplary embodiment of the disclosure, radio channels are assigned to all base stations randomly. This is likely to ensure that radio channels are evenly assigned to a large number of devices.

In a preferred exemplary embodiment, a method of assigning radio channels to a set of base stations in a wireless network includes assigning one radio channel out of a determined set of radio channels to each base station during manufacture of the base stations in such a way that each radio channel is assigned substantially an equal number of times.

In another exemplary embodiment, a method of assigning radio channels to a set of base stations in a wireless network includes assigning one radio channel out of a determined set of radio channels to each base station during manufacture of the base stations in such a way that each radio channel is assigned substantially an equal number of times, determining a given order for the radio channels, selecting a first base station and assigning one available radio channel thereto, selecting a second base station and assigning a radio channel having the next order number thereto or, if the radio channel assigned to the first base station has the largest order number out of the determined set of radio channels, assigning a radio channel having the smallest order number thereto, and continuing assigning radio channels according to order numbers in an ascending or descending order until radio channels are assigned to the entire set of base stations.

In yet another exemplary embodiment, a method of assigning radio channels to a set of base stations in a wireless network includes assigning one radio channel out of a determined set of radio channels to each base station during manufacture of the base stations in such a way that each radio channel is assigned substantially an equal number of times, and assigning a randomly selected radio channel out of the determined set of radio channels to the first base station.

In another exemplary embodiment, a method of assigning radio channels to a set of base stations in a wireless network includes assigning one radio channel out of a determined set of radio channels to each base station during manufacture of the base stations in such a way that each radio channel is assigned substantially an equal number of times, and assigning a radio channel derived on the basis on an individual serial number of the base station out of the determined set of radio channels to each base station.

In yet another exemplary embodiment, a method of assigning radio channels to a set of base stations in a wireless network includes assigning one radio channel out of a determined set of radio channels to each base station during manufacture of the base stations in such a way that each radio channel is assigned substantially an equal number of times, and assigning a randomly selected radio channel out of the determined set of radio channels to each base station.

BRIEF DESCRIPTION OF THE DRAWINGS

Exemplary embodiments are described by way of example with reference to the attached figures, in which.

DETAILED DESCRIPTION OF THE PREFERRED EMBODIMENTS

Figure 1:
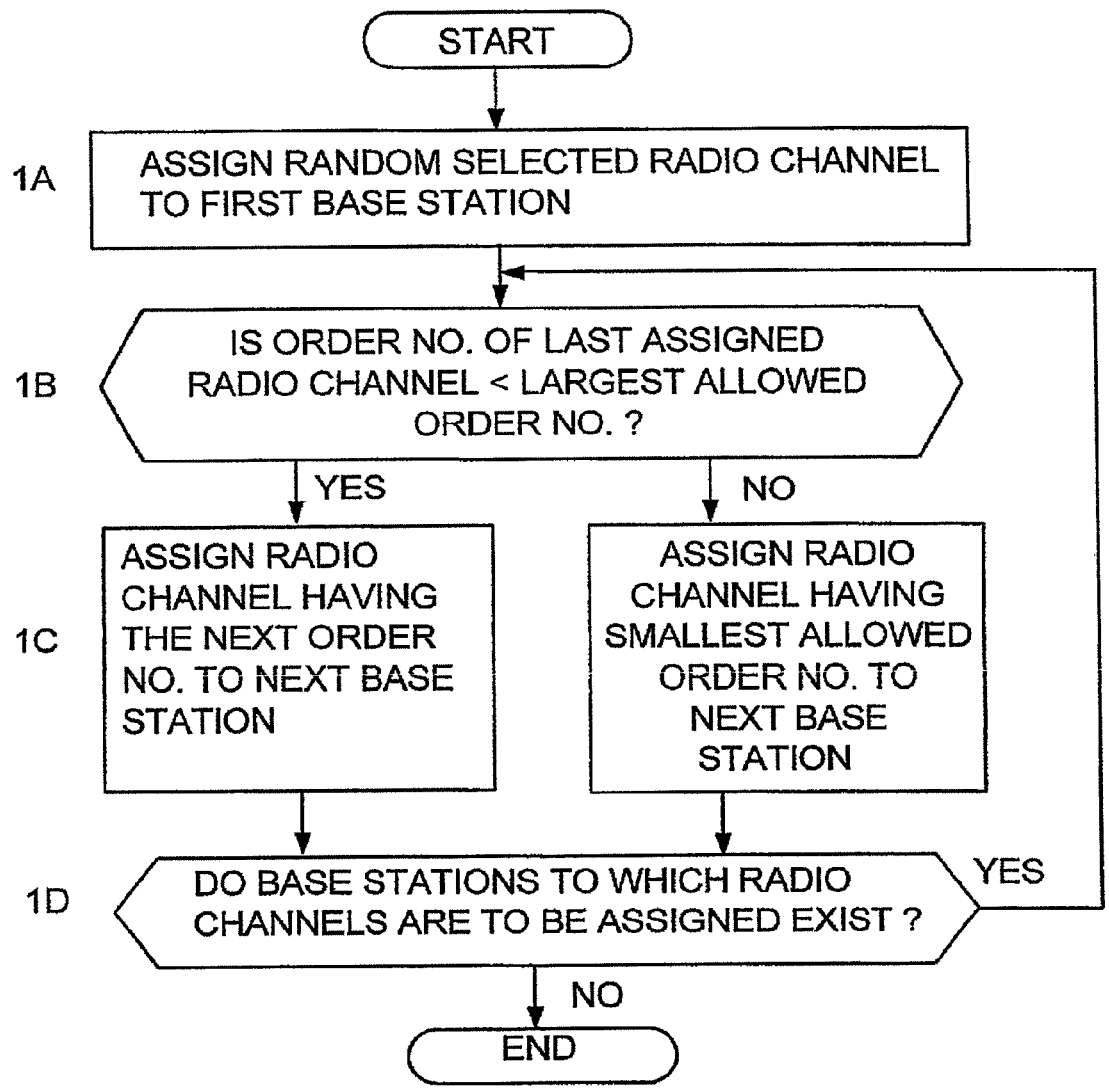
FIG. 1 is a flow chart of an exemplary embodiment method of the present disclosure.

FIG. 1 is a flow chart of an exemplary embodiment method of the present disclosure. Let us assume by way of example that a production lot involving base stations for wireless networks delivered to Europe is concerned, the number of available radio channels being 13 and the radio channels being numbered from one to 13. In step 1A, a randomly selected radio channel is assigned to a first base station. In step 1B. a check is made to see if the order number of this base station is smaller than the largest allowed order number, i.e. less than 13. If the order number of the assigned radio channel is less than 13, the next radio channel in order is assigned to the next base station in step 1C. If the order number of the assigned radio channel is not less than the largest allowed order number, i.e. 13, but equal to 13, a radio channel whose order number is the smallest allowed, i.e. in this example one, is assigned to the next base station in step 1C. This way radio channels are assigned in order until the end of the production lot. In step 1D, a check is made to see if base stations to which radio channels are to be assigned still exist. If so, the process returns to step 1B. If not, the radio channel assignment process ends.

Figure 2:
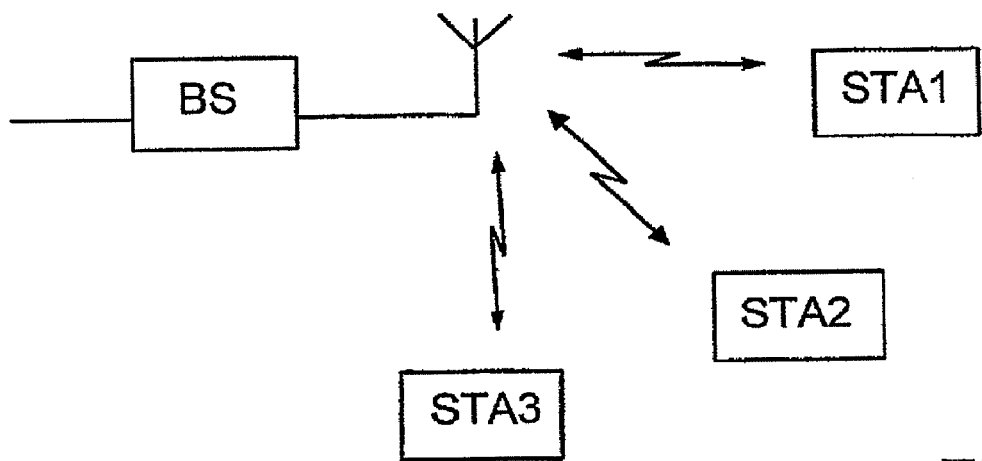
FIG. 2 is a block diagram of an exemplary embodiment system of the present disclosure.

FIG. 2 is a block diagram of a system to which the inventive method is applicable. The wireless local area network shown comprises a base station BS and terminals STA1, STA2, STA3, which have a radio channel connection to the base station BS. The base station may be an ADSL terminal (Asymmetric Digital Subscriber Line), enabling a fast Internet connection. Such a wireless local area network is typically located at a home or a small office. The terminals STA1, STA2, STA3 may be for example portable computers having a local area network card or household appliances controlled from the network.

Let us assume that before delivery an individual network name and a certain radio channel to be used are set at the factory as default values for the base station BS. Before the terminals STA1, STA2, STA3 can be coupled to the network, the same network name has to be given to the terminals STA1, STA2, STA3. The network name of the base station BS, the name being e.g. part of a running serial number, can be read from a sticker attached to the base station BS and input in the terminals STA1, STA2, STA3. Once the base station BS is switched on, it starts to send a signal on the selected radio channel. At this point, the terminals STA1, STA2, STA3 are aware of the radio channel selected, since at the factory, radio channels are assigned to base stations such that all radio channels are used equally in the entire production lot. Once the same network name is input in the terminals STA1, STA2, STA3 as is in the base station BS, the terminals STA1, STA2, STA3 detect the signal including the network name sent by the base station BS and use it to find the radio channel employed for communication. This is carried out by the terminals STA1, STA2, STA3 going systematically through all available radio channels until they find the channel on which their network name appears.

The above method of selecting a radio channel and a network name aims at optimal network performance by minimizing intra-network interference. An individual network name and equal use of all radio channels minimizes the probability of interference between adjacent wireless local area network.

It is to be understood that the above specification and the related figures are only intended to illustrate exemplary embodiments of the present disclosure. Different variations and modifications of the exemplary embodiments will be apparent to those skilled in the art without deviating from the scope or spirit of the invention as defined in the attached claims.

What is claimed is:

1. A method of assigning radio channels to a set of base stations, the method comprising:

assigning, during manufacture of the set of the base stations, a first radio channel of a determined set of radio channels to a first plurality of the set of base stations;

assigning, during manufacture of the set of the base stations, a second radio channel of the determined set of radio channels having a next order number to a second plurality of the set of base stations or if the first radio channel has a largest order number of the determined set of radio channels, assigning the second radio channel of the determined set of radio channels to the second plurality of the set of base stations as a smallest order number of the determined set of radio channels; and assigning, during manufacture of the set of the base stations, radio channels of the determined set of radio channels to the set of base stations until all base stations of the set of base stations are assigned a radio channel of the determined set of radio channels.

2. A method as claimed in claim 1, wherein the first radio channel of the determined set of radio channels assigned to the first base station is randomly selected.

3. A method as claimed in claim 1, wherein the determined set of radio channels are assigned to the set of base stations before the set of base stations are taken into use.

4. A method as claimed in claim 1, wherein each of the determined set of radio channels is assigned to the set of base stations substantially an equal number of times.

5. A base station comprising:
- a transceiver configured to communicate with at least one terminal via a radio channel, wherein the radio channel was selected from a set of radio channels during manufacture of a set of base stations, wherein during the manufacture of the set of base stations:
- a first radio channel of a determined set of radio channels was assigned to a first plurality of the set of base stations;
- a second radio channel of the determined set of radio channels having a next order number was assigned to a second plurality of the set of base stations or if the first radio channel had a largest order number of the determined set of radio channels, the second radio channel of the determined set of radio channels was assigned to the second plurality of the set of base stations as a smallest order number of the determined set of radio channels; and
- radio channels of the determined set of radio channels were assigned to the set of base stations until all base stations of the set of base stations were assigned a radio channel of the determined set of radio channels.

6. A base station as claimed in claim 5, wherein the first radio channel of the determined set of radio channels assigned to the first plurality of the set of base stations was randomly selected.

7. A base station as claimed in claim 5, wherein each radio channel of the determined set of radio channels was assigned to the base station before the base station was taken into use.

8. A base station as claimed in claim 5, wherein each of the determined set of radio channels were assigned to the set of base stations substantially an equal number of times.

\* \* \* \* \*